United States Patent [19]
Bakker

[11] 3,796,296
[45] Mar. 12, 1974

[54] CONVEYOR WITH ANGULARLY ADJUSTABLE TRANSITION SECTION

[75] Inventor: Donavon L. Bakker, Fort Atkinson, Wis.

[73] Assignee: Butler Manufacturing Company, Kansas City, Mo.

[22] Filed: Feb. 2, 1972

[21] Appl. No.: 222,822

[52] U.S. Cl.................... 198/109, 198/204, 193/17
[51] Int. Cl............................................ B65g 41/00
[58] Field of Search ................................. 193/16–21, 193/25 R, 25 E, 25 FT, 25 C, 35 F; 198/90, 91, 94, 99, 109, 121–123, 189, 204

[56] References Cited
UNITED STATES PATENTS

| | | | |
|---|---|---|---|
| 1,373,436 | 4/1921 | Lombi................................. | 198/109 |
| 3,508,642 | 4/1970 | Standley et al. ..................... | 198/204 |
| 946,282 | 1/1910 | Snyder et al......................... | 198/109 |
| 2,951,579 | 9/1960 | Stauth et al.......................... | 198/204 |
| 1,128,880 | 2/1915 | Jamison ........................... | 198/109 X |
| 1,962,372 | 6/1934 | Twomley............................ | 193/35 F |

Primary Examiner—Evon C. Blunk
Assistant Examiner—W. Scott Carson
Attorney, Agent, or Firm—Claude W. Lowe; Carter H. Kokjer; William B. Kircher

[57] ABSTRACT

A conveyor having an angularly adjustable transition section which permits angular adjustment of a straight infeed section with respect to a straight outfeed section through a range from longitudinal alignment of the sections to an angular relationship of approximately 45° without adding or removing parts of the conveyor.

2 Claims, 5 Drawing Figures

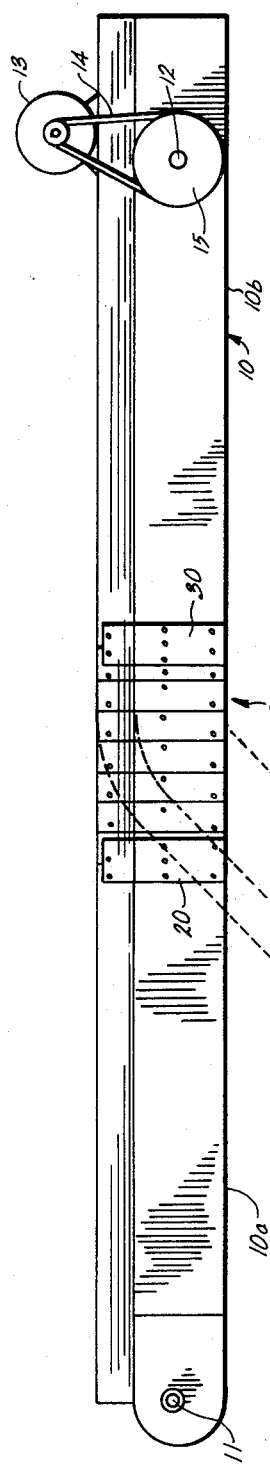
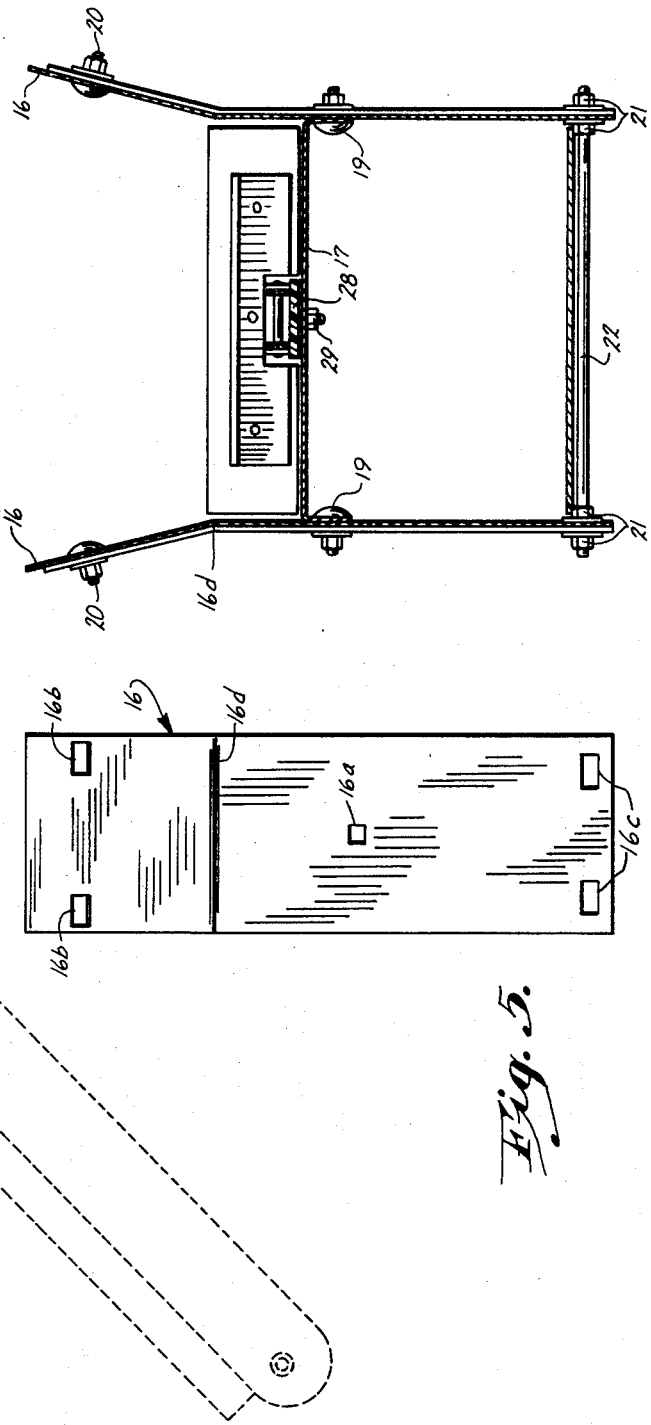
Fig. 1.
Fig. 3.
Fig. 5.

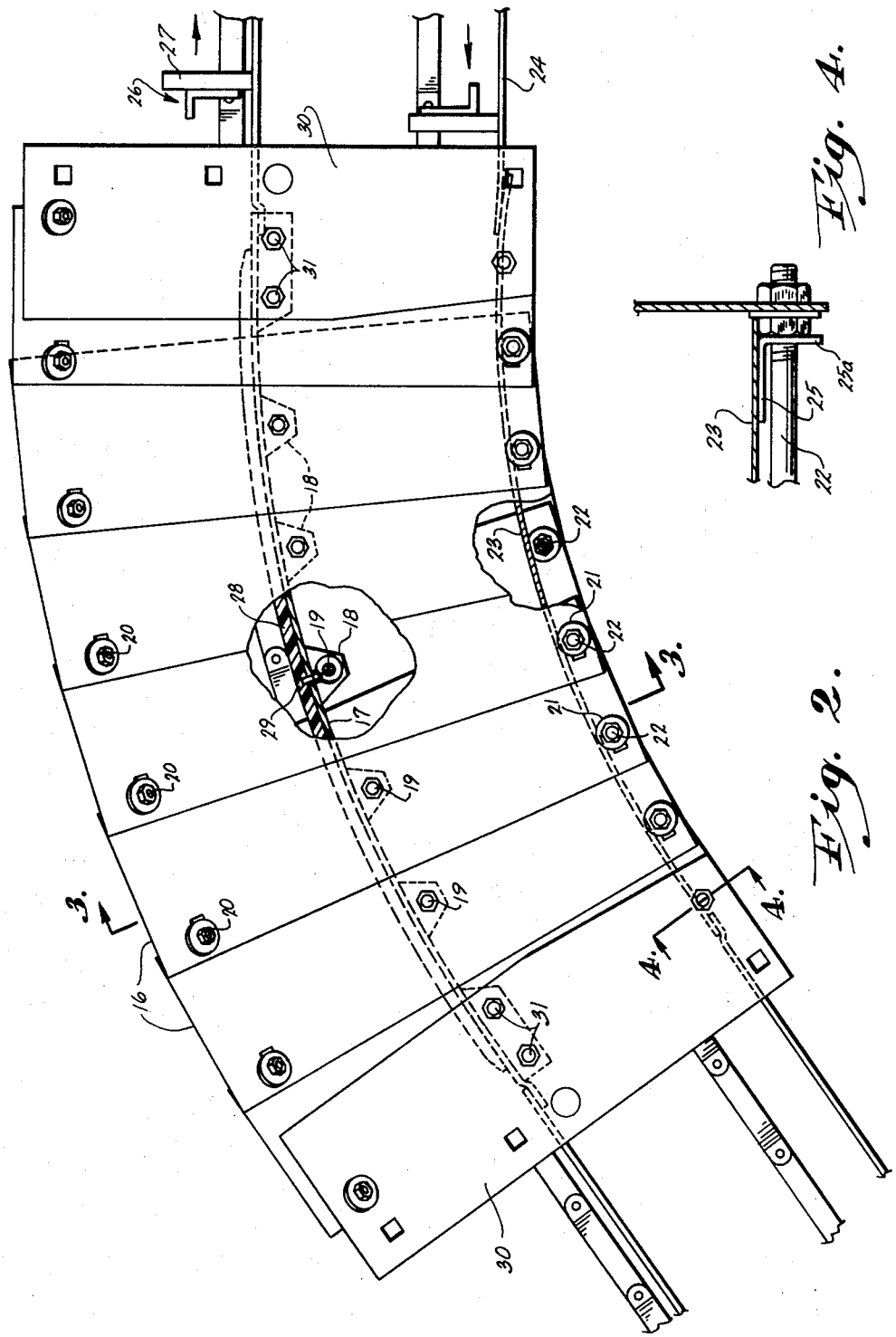

3,796,296

CONVEYOR WITH ANGULARLY ADJUSTABLE TRANSITION SECTION

BACKGROUND AND SUMMARY OF THE INVENTION

In livestock feedlots, barns and similar locations, conveyors have been widely used for moving feed from point to point. As is to be expected however, the location of the points relative to one another, particularly with respect to relative elevation (i.e., height above the ground) will vary rather widely from one location to another. Moreover, even at one location it may be desirable to effect a change in relative heights as equipment is modified or replaced.

To accomodate such changes it has been a practice in the past to provide a conveyor which is made up of an essentially straight infeed or base section, and a similar outfeed section, the infeed and outfeed sections being connected together by an intermediate transition section which is made up of segments which can be removed or added as desired to arrive at an approximation of the desired angle between the infeed and outfeed sections. However, in arrangements of this type of which I am aware, not only does adjustment of the angle require temporary dismantling of the equipment along with having on hand a supply of additional segments, but also it is not possible to hold the adjustment of the angle to less than a 5° increment. Each additional increment requires an additional segment, and to reduce the angle requires that parts be taken out and the remaining parts reconnected.

One of the principal advantages served by the present invention is that it provides an angularly adjustable conveyor of the character described, which can be quickly and easily adjusted to any selected angle in the range permitted by the particular structure, preferably 0° to 45°, without requiring any dismantling of the side walls and other components of the conveyor. In my invention, the adjustment of the angle requires simply the loosening and tightening of nuts and bolts, none of which need to be totally disconnected from the structure while adjustment is taking place.

Other objects and advantages of the invention together with the features and novelty appurtenant will appear in the course of the following description.

DETAILED DESCRIPTION

In the accompanying drawings, which form a part of the specification and are to be read in conjunction therewith, and in which like reference numerals indicate like parts in the various views;

FIG. 1 is a side elevational view showing a complete conveyor equipped with a transition section according to a preferred embodiment of my invention, the solid lines indicating the conveyor with the straight infeed and outfeed sections aligned (0° angle) and the broken lines indicating an angular relationship of approximately 45° with the transition section arced to accomodate the angle;

FIG. 2 is a fragmentary side elevational view on a greatly enlarged scale showing the transition section in a curved condition;

FIG. 3 is a sectional view taken generally along line 3—3 of FIG. 2 in the direction of the arrows;

FIG. 4 is a sectional view taken generally along line 4-4 of FIG. 2 in the direction of the arrows; and FIG. 5 is a side elevational view of a typical side segment member on substantially the same scale as FIGS. 2 and 3.

Referring now to the drawings, the complete conveyor structure is indicated generally in FIG. 1, and identified by reference numeral 10. The illustrated conveyor is of the single chain endless type known to the trade, having upper and lower flights (as will subsequently be described) and trained about an idler sprocket (not shown) at one end, which is on axle 11 and a drive sprocket (also not shown) which is on axle 12 at the other end. The drive sprocket is driven by any conventional means, such as the combined motor and speed reduction unit 13 and the drive belt 14 to sheave 15 on the axle 12.

The conveyor is made up of essentially three sections, namely, what will be termed a relatively straight infeed section 10a, a relatively straight outfeed section 10b and an intermediate or transition section 10c. It is primarily the latter portion of the conveyor that will be dealt with herein in detail. The transition section is so constructed that it is possible to adjust the shape of the conveyor from the horizontally aligned condition shown in solid lines in FIG. 1 to an angular condition through an arc approximating 45°, the latter position being illustrated generally in the broken lines.

Referring now in more detail to FIGS. 2, 3 and 5, the transition section 10c is made up for the large part of a plurality of substantially identical segmental side wall members 16, which are disposed on opposite sides of and form the side walls for transition section 10c. The members are connected together in partially overlapping serial fashion, and are disposed to provide two side walls on opposite sides of a deformable support structure in the form of an upper drag pan 17. The upper drag pan 17 is conformed to form a continuation of the drag pan sections 17a, 17b of the infeed and outfeed sections of the conveyor.

As can best be seen in FIG. 2, the drag pan 17 is formed essentially as a flat sheet of material which is deformable from a straight or flat condition to the arced condition of FIG. 2 without too much difficulty. A light gauge steel will serve the purpose. The drag pan is essentially rectangular in plan, and has spaced along the opposite side edges a plurality of depending ears or flanges 18 which lie adjacent the side members 16. Each lug has connected to it one of the side segments 16, the connection being made by means of a bolt and nut assembly 19.

As can best be appreciated by referring to FIG. 5, each side member 16 is constructed with five openings therein, namely a center opening 16a, which receives the fastener assembly 19, two upper, horizontally elongated openings 16b near the upper corners, and two similarly formed openings 16c at the lower corners. Each side member is also formed with a slight break 16d, so as to provide a slightly flaring side wall for the conveyor.

The upper portions of adjacent side members 16 are interconnected through the medium of bolt and nut assemblies 20. Due to the elongation of the slots through which these assemblies are received, it is evident that the adjacent upper portions can be moved toward or away from one another. The openings are so arranged that the upper portions may be moved from the horizontal condition of FIG. 1, i.e., with the sections of the conveyor aligned, to the arcuate arrangement of FIG. 2.

The lower portions of the side members 16 are similarly interconnected. However, in this instance instead of using separate bolt and fastener assemblies, inside and outside nut washer assemblies 21 are provided on a cross rod 22 which is threaded at each end in order to receive the assemblies 21. As in the case of the upper portions of the side members, they can be brought closer together or further apart simply by loosening the nuts and shifting the side members in accordance with the permissible travel allowed by the elongated slots.

The lower cross rods 22 serve as a support for a lower pan 23 which, like the upper pan 17, is formed of an easily deformable material. The lower pan is slidably supported upon the rods with its uppermost end overlapping or underlapping the bottom pan 24 of the adjoining straight conveyor section.

The bottom pan is anchored by means of the arrangement illustrated in the sectional view, FIG. 4. An L-shaped clip 25 is welded or otherwise securely attached to the bottom of the pan 23, and has a depending flange 25a. The flange 25a is aperatured to receive the cross rod 22. There are clips 25 on each side of the pan, and obviously the clips will hold the pan against movement in the direction of the conveyor chain.

The conveyor chain C carries at spaced intervals along its length the blades 26 which, in the preferred embodiment, comprise metal backing flanges secured to the chain and to which are mounted blades or paddles 27 constructed of rubber or other resilient material. The upper pan sections 17, 17a and 17b support the upper flight of chain C, and the lower pan supports the lower or return flight.

To inhibit wear on the center portion of the drag pan, i.e., that portion underlying the conveyor chain C, I have provided a strip 28 of a flexible, wear-resistant and low friction material, for example, polyethylene. As can be seen in FIG. 3, the strip extends longitudinally on the pan 17. It is secured to the pan at intervals by bolt and nut assemblies 29 which are countersunk into the top of the strip in order to provide a flush surface.

The entire transition section is adapted to be connected into the infeed and outfeed sections of the conveyor by the splice plates 30, which can be viewed both in FIGS. 1 and 2. The splice plates 30 are secured to the endmost side wall sections 16. These sections also provide a non-pivotal anchor point for the opposite ends of the pan 17 through the medium of the two bolt and nut assemblies 31 which extend through elongated ears similar to the ears 18 on the pan. The splice plates are, of course, simply bolted to the end sections of the conveyor to provide the necessary interconnection.

The manner of operation of the invention is believed readily apparent from the foregoing description. In order to change the angle of the conveyor, it is necessary only to loosen the fastener assemblies 20, 21, reset the conveyor at the angle desired, and then retighten the connections. Neither the lower pan nor upper pan need be disassembled, nor do any parts need to be removed or replaced in order to effect the change in angle. The adjustability within the range of maximum movement can be infinitely small, and there is no limitation as to adjustments in selected angular increments. The transition section is complete in itself, and requires no additional parts to be kept in supply, or for that matter, storage of parts taken out during times when angles other than the ones illustrated are being employed.

From the foregoing it will be seen that this invention is one well adapted to attain all the ends and objects hereinabove set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawing is to be interpreted as illustrative and not in a limiting sense.

Having thus described my invention, I claim:

1. In a drag conveyor, substantially straight infeed and outfeed conveyor sections forming spaced upper and lower flat supporting surfaces for an endless conveyor, the confronting ends of said sections being spaced from one another, an angularly adjustable transition section interconnecting said infeed and outfeed sections forming therewith a first continuous conveyor surface extending between said upper supporting surfaces and a second conveyor surface extending between said lower supporting surfaces, said transition section including a. an intermediate sheet-like drag pan extending between and connected to the confronting ends of said upper infeed and outfeed support surfaces and forming with said surfaces a substantially continuous conveyor supporting drag pan extending through said transition section, said intermediate drag pan having parallel side edges and being flexible whereby to permit bending to different curvatures to accommodate varying of the angle between the infeed and the outfeed sections, b. a flexible bottom pan disposed below said intermediate drag pan and defining a space between said pans, one end of said bottom pan being connected to one of said lower supporting surfaces of said sections, and the other end being in overlapping relationship with the lower supporting surface of the other of said sections whereby to slide with respect to said lower supporting surface of said other section when the angle between the infeed and outfeed sections are varied, c. side walls connected with side edges of said intermediate drag pan, each side wall comprising
  i. a plurality of plate-like side members partially overlapping in series in the lengthwise direction of the intermediate drag pan with the side members extending above and below the intermediate drag pan, and
  ii. means connecting adjoining side members to each other and said intermediate drag pan for adjustment of the area overlap of said side members for different curvatures of said intermediate drag pan, and d. bottom pan support members extending between oppositely aligned side members below said bottom pan and connected to said side members.

2. The improvement as in claim 1,
   a. said intermediate drag pan having a plurality of ears spaced along and depending from each side edge thereof, and
   b. means connecting individual side members to each of said ears.

* * * * *